(12) United States Patent
Ueda et al.

(10) Patent No.: US 7,336,047 B2
(45) Date of Patent: Feb. 26, 2008

(54) MOTOR VEHICLE STEERING SYSTEM

(75) Inventors: Takeshi Ueda, Kashiba (JP); Shigeki Nagase, Nabari (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/522,337

(22) Filed: Sep. 18, 2006

(65) Prior Publication Data

US 2007/0063663 A1    Mar. 22, 2007

(30) Foreign Application Priority Data

Sep. 22, 2005 (JP) ............................ 2005-276243
Feb. 27, 2006 (JP) ............................ 2006-050781

(51) Int. Cl.
  *B62D 5/04* (2006.01)
  *B62D 6/00* (2006.01)
(52) U.S. Cl. ...................... 318/432; 180/443
(58) Field of Classification Search ................ 318/432, 318/433, 488, 489; 180/443, 446; 361/31; 701/41
See application file for complete search history.

(56) References Cited

U.S. PATENT DOCUMENTS 5,361,210 A * 11/1994 Fu ................. 701/41
5,521,475 A * 5/1996 Fu et al. ............. 318/459
6,392,854 B1 * 5/2002 O'Gorman ............ 361/31
6,407,524 B1 * 6/2002 Endo et al. ........... 318/432
6,469,463 B2 * 10/2002 Chen et al. ........... 318/439
6,877,584 B2 * 4/2005 Jonokuchi et al. ....... 180/446

FOREIGN PATENT DOCUMENTS

JP    2002-272179    9/2002

* cited by examiner

*Primary Examiner*—Bentsu Ro
(74) *Attorney, Agent, or Firm*—Rabin & Berdo, P.C.

(57) ABSTRACT

A motor vehicle steering system includes a motor driving circuit connected between a power supply and a ground for driving a multi-phase motor, PWM signal generating unit for generating an each-phase PWM signal for controlling a current flowing through each of phases of the multi-phase motor and feeding the each-phase PWM signal to the motor driving circuit, a single current sensor connected between the motor driving circuit and the power supply or the ground, and each-phase current value computing unit for finding an each-phase current value flowing through each of the phases of the multi-phase motor on the basis of an output of the current sensor. The PWM signal generating unit shifts the fall or rise timing of a carrier wave of the each-phase PWM signal by a predetermined phase shift amount.

5 Claims, 4 Drawing Sheets

MOTOR VEHICLE STEERING SYSTEM

BACKGROUND OF THE INVENTION

1. Field of the Invention

The present invention relates to a motor vehicle steering system such as an electric power steering system.

2. Description of Related Art

In electric power steering systems, for example, three-phase blushless motors are employed as driving sources. The three-phase blushless motor is subjected to feedback control on the basis of the operation of a steering wheel, so that a steering assist force responsive to the operation of the steering wheel is produced from the three-phase blushless motor.

Specifically, the electric power steering system comprises a three-phase inverter circuit for driving the three-phase blushless motor, a microcomputer for controlling ON/OFF of switching elements provided in the three-phase inverter circuit, and current sensors for detecting the respective values of currents supplied to phases of the three-phase blushless motor from the three-phase inverter circuit. The current sensor is provided for each of the phases. A detection signal of the current sensor is inputted to the microcomputer. The microcomputer determines an each-phase target current value responsive to the operation of the steering wheel. Each of the switching elements provided in the three-phase inverter circuit is turned on/off by a duty corresponding to a deviation between the each-phase target current value and the each-phase current value detected by each of the current sensors. Consequently, currents having the each-phase target current values are respectively supplied to the phases of the three-phase blushless motor, so that a steering assist force responsive to the operation of the steering wheel is generated from the three-phase blushless motor.

However, non-uniformity occurs in the rotation of the three-phase blushless motor due to variations in sensitivity (properties) among the current sensors, which may cause torque ripple to be generated in the three-phase blushless motor. The torque ripple in the three-phase blushless motor causes the steering wheel to be vibrated, which degrades a steering feeling.

Since the current sensor is provided for each of the phases of the three-phase blushless motor, the cost is high.

SUMMARY OF THE INVENTION

An object of the present invention is to provide a motor vehicle steering system that can reduce the generation of torque ripple in a multi-phase motor and with which cost can be reduced.

A motor vehicle steering system according to the present invention is a motor vehicle steering system that drives a multi-phase motor by PWM control in response to the operation of an operation member, to apply a driving force from the multi-phase motor to a steerable vehicle wheel of a vehicle, comprising a motor driving circuit connected between a power supply and a ground for driving the multi-phase motor; PWM signal generating unit for generating an each-phase PWM signal for controlling a current flowing through each of phases of the multi-phase motor and applying the generated PWM signal to the motor driving circuit; a single current sensor connected between the motor driving circuit and the power supply or the ground; and each-phase current value computing unit for finding an each-phase current value flowing through each of the phases of the multi-phase motor on the basis of an output of the current sensor. The PWM signal generating unit shifts a fall or rise timing of carrier waves of the each-phase PWM signals from one another by a predetermined phase shift amount.

The PWM signal generating unit may set a duty set value for each phase on the basis of an each-phase target current value and the each-phase current value found by the each-phase current value computing unit.

For example, in a case where the respective fall timings of the each-phase PWM signals to a low level are shifted from one another, there exits a time period during which after the PWM signal in a reference phase (e.g., a V phase) serving as a basis (referred to as a "reference phase PWM signal" in this section) falls to a low level, only the PWM signal (referred to as a "first shift phase PWM signal" in this section) in other phases (a first shift phase: a U phase, for example) is at a high level. In this time period, a current flowing between the motor driving circuit and the power supply or the ground is a current flowing through the first shift phase. Therefore, the value of the current flowing through the first shift phase can be obtained on the basis of a signal outputted from the current sensor in such a time period. If the respective fall timings of the each-phase PWM signals to a low level are shifted from one another, there also exists a time period during which the first shift phase PWM signal and the reference phase PWM signal are at a high level, so that the sum (a total current value) of the respective values of currents flowing through two phases, i.e., the first shift phase and the reference phase can be obtained on the basis of a signal outputted from the current sensor in this time period. The value of the current flowing through the reference phase can be obtained by subtracting the value of the current flowing through the first shift phase found in the above-mentioned manner from the total current value.

In such a way, the value of the each-phase current flowing through each of the phases of the multi-phase motor can be found on the basis of the output signal of the single current sensor. Therefore, in contrast to the configuration in which a current sensor is provided for each phase, there is no problem of variations in sensitivity (properties) among the current sensors, so that the generation of torque ripple in the multi-phase motor can be reduced. Since only a single current sensor is required, the cost can be reduced.

For example, considering a time period during which only the PWM signal (referred to as a "second shift phase PWM signal" in this section) in a phase (a second shift phase: a W phase, for example) other than the reference phase and the first shift phase is at a high level, and the reference phase PWM signal and the first shift phase PWM signal are at a low level, a path in which a current can flow through the motor driving circuit and the multi-phase motor is formed between the power supply and the ground in the time period, and an undesirable current of magnitude corresponding to a phase shift amount of the second shift phase PWM signal relative to the reference phase PWM signal flows through the path. When such a current is detected by the current sensor, there occurs an error in the results of the computation by the each-phase current value computing unit. In order to avoid this, it is desirable that the phase shift amount of the second shift phase PWM signal is set to a value that is as small as possible. When the phase shift amount is set to a small value, however, an accurate detection output corresponding to the magnitude of the current cannot be obtained during the above-mentioned time period because of the problem of responsiveness of a circuit for amplifying the output signal of the current sensor in case where a large current flows through the second shift phase, and the value of the large current cannot be accurately found by the each-phase current value computing unit.

Therefore, the PWM signal generating unit may comprise shift amount setting unit for setting each phase shift amount on the basis of the duty set value for each phase.

In this case, the shift amount setting unit may set, on the basis of a difference between the duty set value for the reference phase serving as a basis and the duty set value for the shift phase other than the reference phase, the phase shift amount of the carrier wave of the PWM signal in the shift phase relative to the carrier wave of the PWM signal in the reference phase.

The difference between the duty set value for the reference phase and the duty set value for the shift phase corresponds to the value of a current flowing through the shift phase. Therefore, a phase shift amount is suitably set on the basis of the duty set value for each phase. As a result, an undesirable current flowing between the power supply and the ground can be kept small when a phase current to be detected by the current sensor is small. On the other hand, it can be ensured that a time period during which an accurate detection output corresponding to the magnitude of the phase current to be detected by the current sensor can be obtained when the phase current is large. Therefore, the value of the current flowing through each of the phases of the multi-phase motor (an each-phase current value) can be found with high precision.

For example, the value of the current flowing through the second shift phase corresponds to the difference between the duty set value for the reference phase or the duty set value for the first shift phase and the duty set value for the second shift phase. If the phase shift amount of the second shift phase PWM signal is set to a larger value as the difference increases, while being set to a smaller value as the difference decreases, therefore, an undesirable current flowing between the power supply and the ground can be kept small when a current flowing through a phase corresponding to the second shift phase PWM signal is small. On the other hand, it can be ensured that a time period during which an accurate detection output corresponding to the magnitude of the current flowing through the phase corresponding to the second shift phase PWM signal can be obtained when the current is large. As a result, the value of the current flowing through the second shift phase can be found with high precision.

Furthermore, the PWM signal generating unit may comprise shift amount setting unit for setting a phase shift amount on the basis of the each-phase current value found by the each-phase current value computing unit in a past control cycle. In this case, if the phase shift amount is set to a larger value as the current value increases, while being set to a smaller value as the current value decreases. An undesirable current flowing between the power supply and the ground can be kept small when a phase current to be detected by the current sensor is small. On the other hand, it can be ensured that a time period during which an accurate detection output corresponding to the magnitude of the phase current to be detected by the current sensor can be obtained when the phase current is large. Therefore, the value of the current flowing through each of the phases of the multi-phase motor (an each-phase current value) can be found with high precision.

The foregoing and other objects, features and effects of the present invention will become more apparent from the following detailed description of the present invention when taken in conjunction with the accompanying drawings.

DETAILED DESCRIPTION OF PREFERRED EMBODIMENTS

Figure 1:
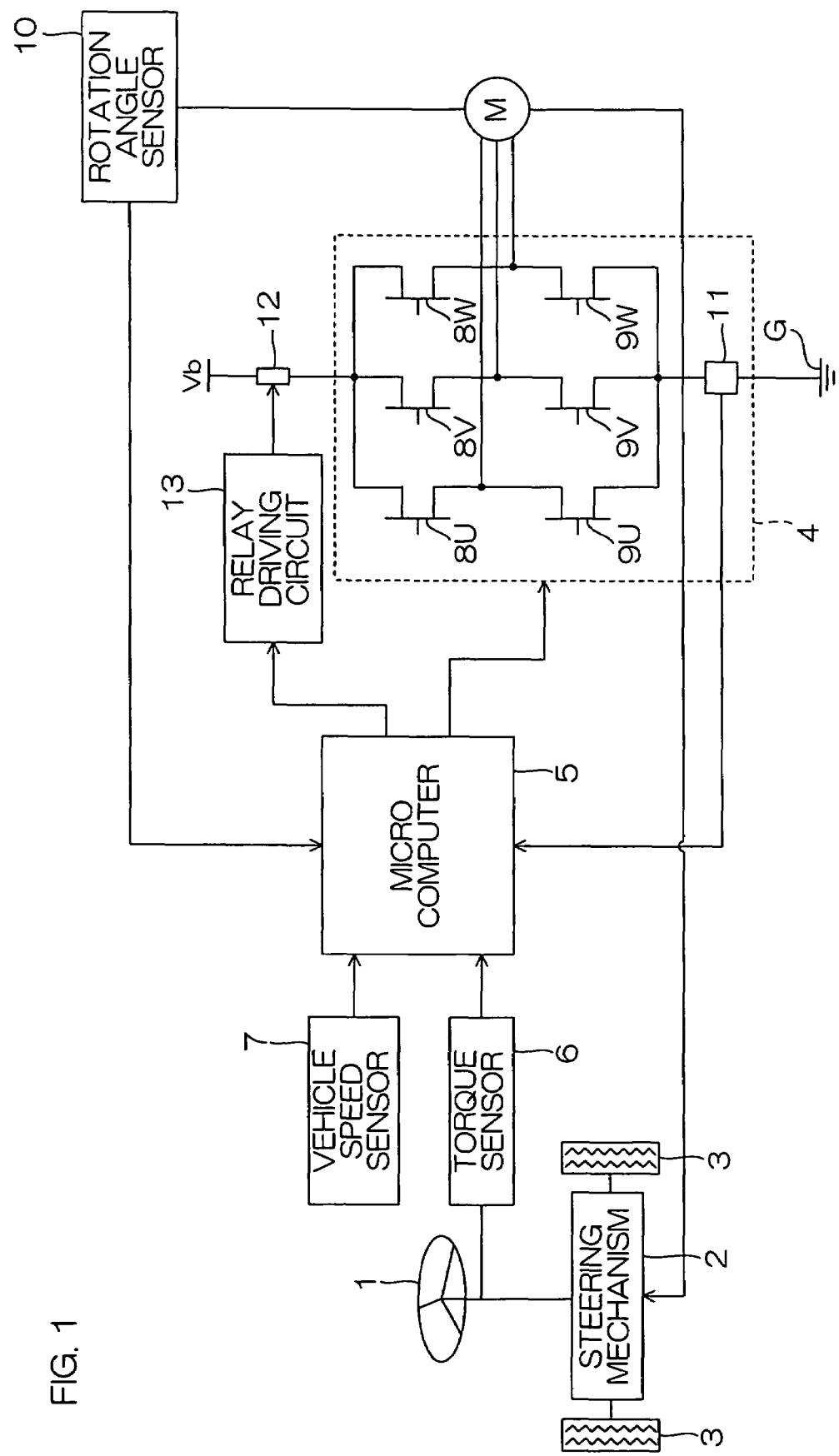
FIG. 1 is a block diagram illustrating the configuration of an electric power steering system according to an embodiment of the present invention.

FIG. 1 is a block diagram illustrating the configuration of an electric power steering system according to an embodiment of the present invention.

The electric power steering system is mounted on a vehicle in use. In the electric power steering system, an electric motor M composed of a three-phase blushless motor is driven in response to the operation of a steering wheel 1 serving as an operation member. Power generated by the electric motor M is transmitted to a steering mechanism 2 to assist in steering (the steering of a steerable vehicle wheel 3 in a vehicle) by the steering mechanism 2.

The electric power steering system comprises a motor driving circuit 4 for supplying a driving current to the electric motor M; a microcomputer 5, serving as PWM signal generating unit and each-phase current value computing unit, including CPU, RAM, and ROM; a torque sensor 6 for detecting a steering torque applied to the steering wheel 1; and a vehicle speed sensor 7 for detecting the travel speed of the vehicle (vehicle speed).

The motor driving circuit 4 is composed of a three-phase inverter circuit. The motor driving circuit 4 has a configuration in which a series circuit of switching elements (power MOSFETs) 8U and 9U, a series circuit of switching elements 8V and 9V, and a series circuit of switching elements 8W and 9W are connected in parallel between a power supply (e.g., a on-vehicle battery) Vb and a ground G.

The series circuit of the switching elements 8U and 9U is connected to a U-phase winding of the electric motor M at a node of the two switching elements 8U and 9U. The series circuit of the switching elements 8V and 9V is connected to a V-phase winding of the electric motor M at a node of the two switching elements 8V and 9V. The series circuit of the switching elements 8W and 9W is connected to a W-phase winding of the electric motor M at a node of the two switching elements 8W and 9W.

A rotation angle sensor 10 for detecting the rotation angle of the electric motor M (the rotation position of a rotor) is provided in relation to the electric motor M. A resolver for outputting a signal having a sinusoidal waveform whose phase is changed in correspondence with the change in the rotation angle of the electric motor M, for example, can be employed for the rotation angle sensor 10. An output signal of the rotation angle sensor 10 is inputted to the microcomputer 5.

An output signal of the torque sensor 6 and an output signal of the vehicle speed sensor 7 are inputted in addition to the output signal of the rotation angle sensor 10 to the microcomputer 5. There is provided on a current path between the motor driving circuit 4 and the ground G a single current sensor 11 for detecting the value of a current flowing through the current path. An output signal of the current sensor 11 is suitably amplified by an amplification circuit (not shown), and is then inputted to the microcomputer 5.

The microcomputer 5 sets a target current value on the basis of the output signals of the torque sensor 6 and the vehicle speed sensor 7. The microcomputer 5 subjects the set target current value to three-phase splitting processing on the basis of a detection signal of the rotation angle sensor 10, to set a target current value in each of the phases of the electric motor M. On the other hand, the microcomputer 5 finds the value of an each-phase current actually flowing through each of the phases of the electric motor M on the basis of the output signal of the current sensor 11, as described in detail later. A PWM (Pulse Width Modulation) signal is generated for each of the phases of the electric motor M on the basis of a deviation between the each-phase target current value and the each-phase current value. The each-phase PWM signal is inputted to the switching elements in each of the series circuits in the motor driving circuit 4. Consequently, the switching elements in each of the series circuits in the motor driving circuit 4 are turned on/off depending on the duty of the PWM signal inputted thereto. As a result, a current corresponding to the steering torque and the vehicle speed flows through the electric motor M, and a driving force (a steering assist force) corresponding to the steering torque and the vehicle speed is generated from the electric motor M.

Furthermore, the electric power steering system comprises a relay 12 for shutting off a power feeding path from the power supply Vb to the motor driving circuit 4 and a relay driving circuit 13 for driving the relay 12. The microcomputer 5 judges that an overcurrent is supplied to the motor driving circuit 4 when a current value detected from the output signal of the current sensor 11 is larger than a predetermined threshold value. In this case, the microcomputer 5 operates the relay 12 through the relay driving circuit 13 as failsafe, to cut off the power feeding path from the power supply Vb to the motor driving circuit 4.

Figure 2:
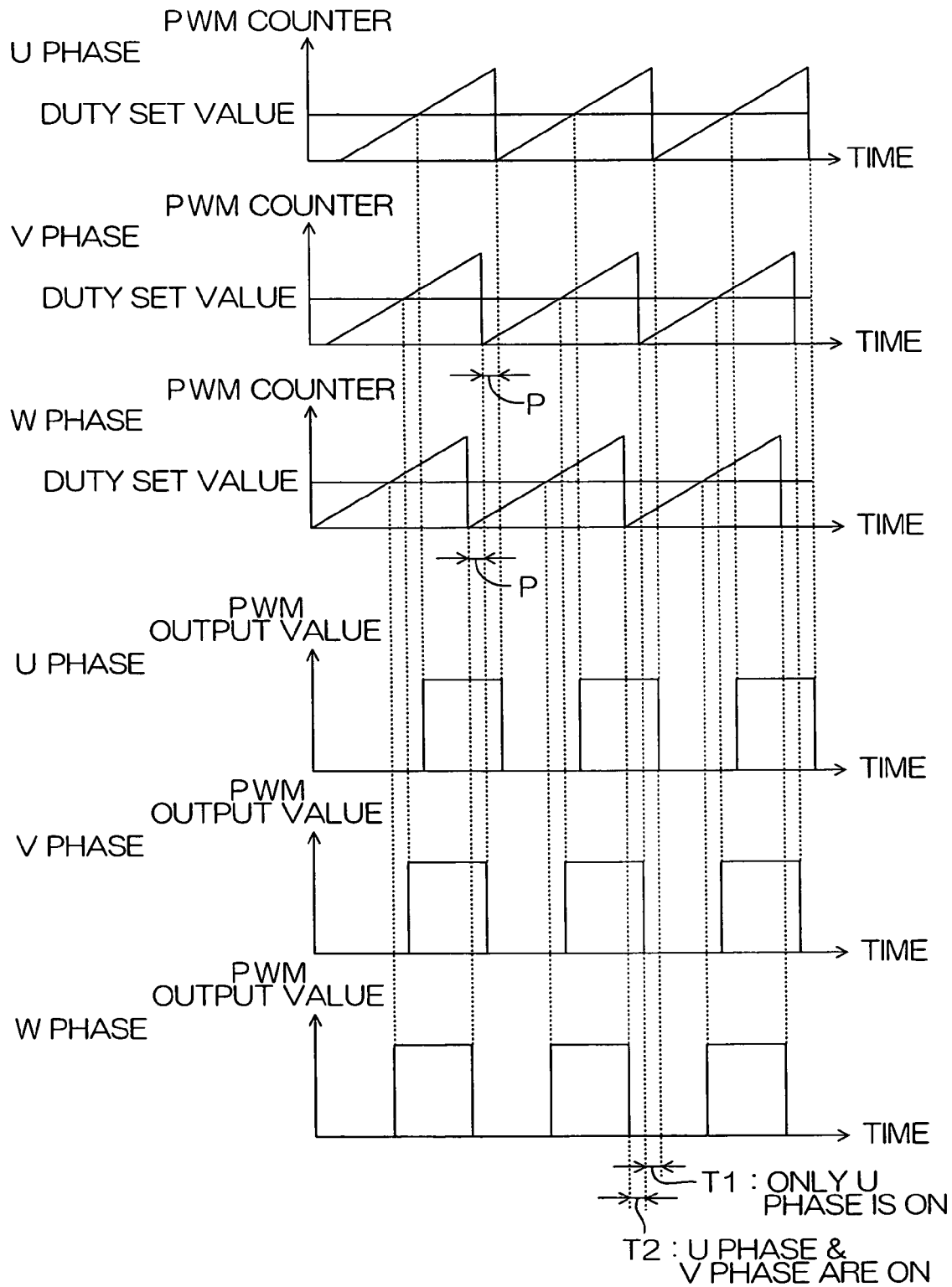
FIG. 2 is a waveform diagram showing an example of an output of an each-phase PWM signal.

FIG. 2 is a waveform diagram showing an example of an output of an each-phase PWM signal. In this embodiment, PWM signals shown in FIG. 2 corresponds to switching elements located at lower side, that is switching elements 9U, 9V and 9W.

The PWM signal is generated by comparing for each of the phases of the electric motor M the respective waveforms of a sawtooth carrier wave (a sawtooth wave) and a duty set value (straight lines) corresponding to a target current value. That is, the PWM signal is a high level in a time period during which the value of the sawtooth wave (the value of a PWM counter) is not less than the duty set value. The PWM signal is a low level in a time period during which the value of the sawtooth wave is below the duty set value.

In the present embodiment, the phase of a sawtooth wave for generating a V-phase PWM signal is advanced by a predetermined shift amount (phase shift amount) P from a sawtooth wave for generating a U-phase PWM signal. Further, the phase of a sawtooth wave for generating a W-phase PWM signal is advanced by the predetermined shift amount P from the sawtooth wave for generating the V-phase PWM signal. The fall timing of the each-phase PWM signal to a low level is synchronized with the fall timing of the sawtooth wave for generating the each-phase PWM signal. Therefore, the fall timing of the U-phase PWM signal to a low level is delayed by a time period T1 (=P) from the fall timing of the V-phase PWM signal to a low level. The fall timing of the V-phase PWM signal to a low level is delayed by a time period T2 (=P) from the fall timing of the W-phase PWM signal to a low level.

Thus, in a time period until the time period T1 has elapsed since the V-phase PWM signal fell to a low level, only the U-phase PWM signal enters a high level, so that only a current flowing through the U-phase winding of the electric motor M (a U-phase current) flows through a current path between the motor driving circuit 4 and the ground G. Consequently, the microcomputer 5 can obtain the value of the U-phase current (a U-phase current value) flowing through the electric motor M by referring to the output signal of the current sensor 11 during the time period.

Further, in a time period until the time period T2 has elapsed since the W-phase PWM signal fell to a low level, the U-phase PWM signal and the V-phase PWM signal enter a high level, so that the U-phase current flowing through the electric motor M and a current flowing through a V-phase winding (a V-phase current) flow through a current path between the motor driving circuit 4 and the ground G. Consequently, the microcomputer 5 can obtain the total current value of the respective values of the U-phase current and the V-phase current flowing through the electric motor M by referring to the output signal of the current sensor 11 in the time period. The value of the V-phase current (a V-phase current value) flowing through the electric motor M can be obtained by subtracting the U-phase current value found in the above-mentioned manner from the total current value.

When the U-phase current value and the V-phase current value are thus obtained, the W-phase current value can be obtained by subtracting the sum of the U-phase current value and the V-phase current value from zero, because the sum of the U-phase current value, the V-phase current value, and the value of a current flowing through the W-phase winding of the electric motor M (a W-phase current value) is zero.

The value of the each-phase current flowing through each of the phases of the electric motor M (the U-phase current value, the V-phase current value, and the W-phase current value) can be thus found on the basis of the output signal of the single current sensor 11. Therefore, the problem of variations in sensitivity (properties) among current sensors, in contrast to the configuration in which a current sensor is provided for each phase, does not arise, so that the generation of torque ripple in the electric motor M can be reduced. Further, only the single current sensor 11 may be required, so that the cost can be reduced.

Figure 3:
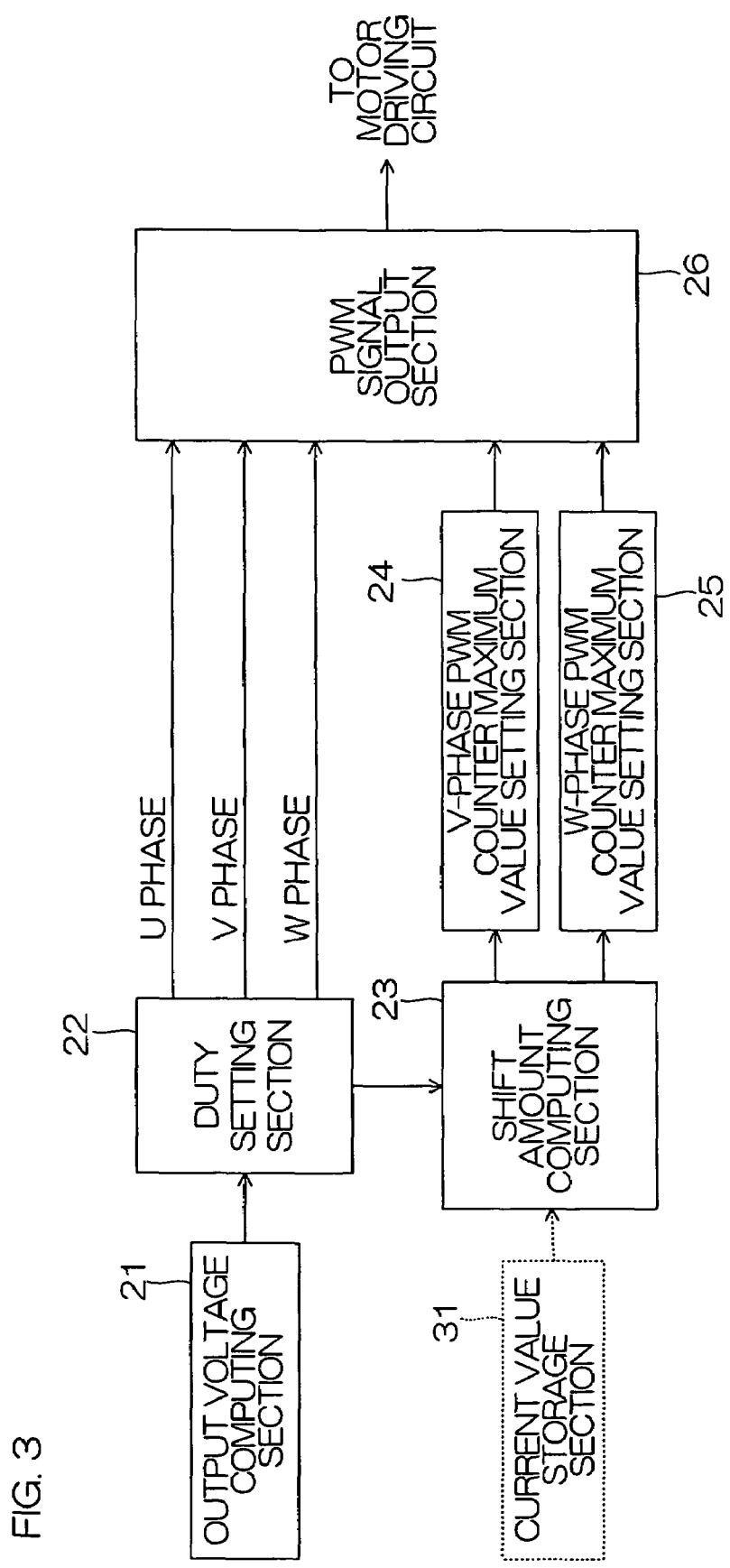
FIG. 3 is a block diagram for explaining another embodiment of the present invention.
Figure 4:
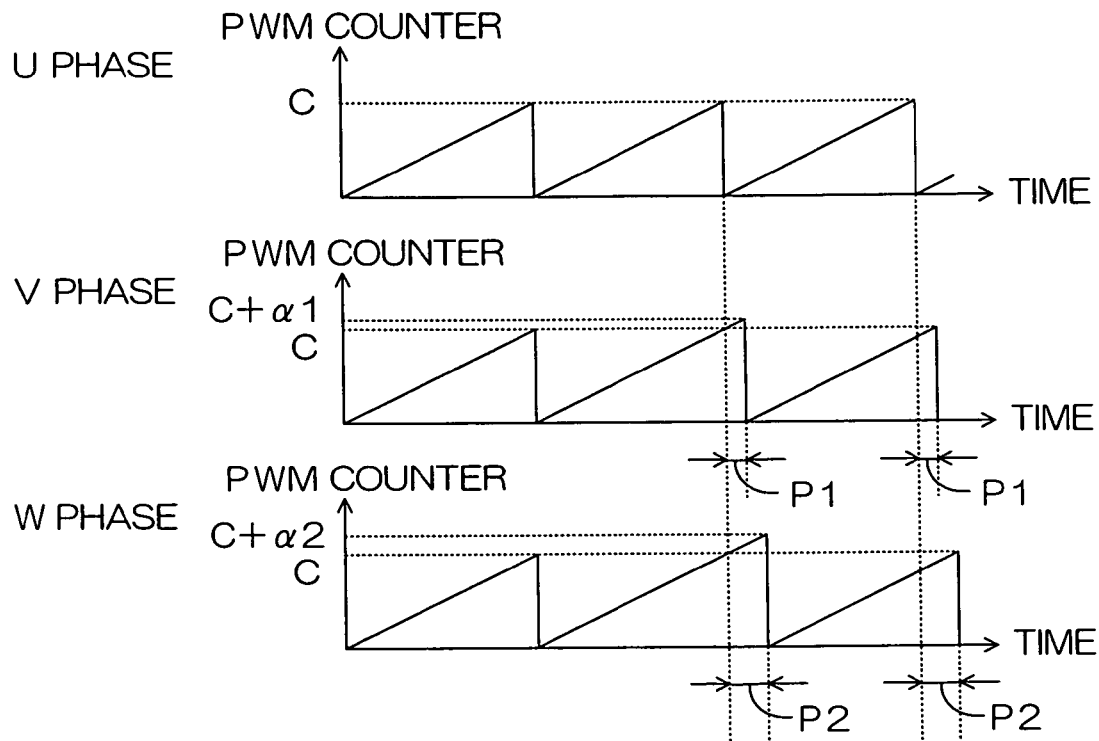
FIG. 4 is a diagram showing an example of a waveform of a sawtooth wave (a carrier wave) for generating an each-phase PWM signal in the another embodiment.

FIG. 3 is a block diagram for explaining another embodiment of the present invention. FIG. 4 is a diagram showing the waveform of a sawtooth wave (carrier wave) for generating an each-phase PWM signal.

In the above-mentioned embodiment, the shift amount of the phase of the sawtooth wave for generating the V-phase PWM signal relative to the sawtooth wave for generating the U-phase PWM signal is fixed at P, and the shift amount of the phase of the sawtooth wave for generating the W-phase PWM signal relative to the sawtooth wave for generating the V-phase PWM signal is fixed at P.

In the present embodiment, the shift amount P1 of the phase of a sawtooth wave for generating a V-phase PWM signal relative to a sawtooth wave for generating a U-phase PWM signal is variably set on the basis of the difference between a duty set value corresponding to a U-phase target current value and a duty set value corresponding to a V-phase target current value. The shift amount P2 of the phase of a sawtooth wave for generating a W-phase PWM signal relative to the sawtooth wave for generating the U-phase PWM signal is variably set on the basis of the difference between the duty set value corresponding to the U-phase target current value and a duty set value corresponding to a W-phase target current value.

In order to realize this, as is shown in FIG. 3, a microcomputer 5 comprises: an output voltage computing section 21 for computing an output voltage corresponding to an each-phase target current value; a duty setting section 22 for setting a duty set value for each phase on the basis of the output voltage computed by the output voltage computing section 21; a shift amount computing section 23 for computing the shift amounts P1 and P2 on the basis of the duty set value for each phase; a V-phase PWM counter maximum value setting section 24 for setting a V-phase PWM counter maximum value on the basis of the shift amount P1; a W-phase PWM counter maximum value setting section 25 for setting a W-phase PWM counter maximum value on the basis of the shift amount P2; and a PWM signal output section 26 for generating and outputting an each-phase PWM control signal on the basis of the duty set value for each phase, the V-phase PWM counter maximum value, the W-phase PWM counter maximum value, and so on, which is as a functional processing section realized by program processing respectively.

The shift amount computing section 23 finds the difference between the U-phase duty set value and the V-phase duty set value that are set by the duty setting section 22. The shift amount computing section 23 sets the shift amount P1 to a larger positive value as the difference increases, while being set to a smaller positive value as the difference decreases. The shift amount computing section 23 finds the difference between the U-phase duty set value and the W-phase duty set value that are set by the duty setting section 22. The shift amount computing section 23 sets the shift amount P2 to a larger positive value as the difference increases, while being set to a smaller positive value as the difference decreases.

Here, the sawtooth wave for generating the each-phase PWM signal has a waveform that increases in proportion to the value of a PWM counter in a range in which the value of the PWM counter reaches a PWM counter maximum value from zero and steeply falls to zero when the value of the PWM counter reaches the PWM counter maximum value, as shown in FIG. 4.

The V-phase PWM counter maximum value setting section 24 multiplies, when the shift amount P1 is set by the shift amount computing section 23, the shift amount P1 by the slope of an inclined portion in the waveform of the sawtooth wave for generating the V-phase PWM signal, to find a maximum value change amount $\alpha1$ corresponding to the shift amount P1. Generally, the PWM counter maximum value is set to C, and the PWM counter maximum value is set to $C+\alpha1$ only for one of the continuous sawtooth waves.

The W-phase PWM counter maximum value setting section 25 multiplies, when the shift amount P2 is set by the shift amount computing section 23, the shift amount P2 by the slope of an inclined portion in the waveform of the sawtooth wave for generating the W-phase PWM signal, to find a maximum value change amount $\alpha2$ corresponding to the shift amount P2. Generally, the PWM counter maximum value is set to C, and the PWM counter maximum value is set to $C+\alpha2$ only for one of the continuous sawtooth waves.

The PWM signal output section 26 compares the waveform of the sawtooth wave for generating the each-phase PWM signal with the waveform of the duty set value for each phase, to generate the each-phase PWM signal, as in the above-mentioned embodiment.

With respect to the sawtooth wave for generating the U-phase PWM signal, the PWM counter maximum value is always set to a fixed value C. With respect to the sawtooth wave for generating the V-phase PWM signal, the V-phase PWM counter maximum value setting section 24 generally sets the PWM counter maximum value to C, and changes the PWM counter maximum value to $C+\alpha1$ that increases by the change amount $\alpha1$ corresponding to the shift amount P1 from C only for one of the continuous sawtooth waves. Consequently, only the cycle of the one sawtooth wave becomes longer by P1 than usual. As a result, the phase of the sawtooth waves that are continuous after that is delayed by the shift amount P1 from the sawtooth wave for generating the U-phase PWM signal. Similarly, with respect to the sawtooth wave for generating the W-phase PWM signal, the PWM counter maximum value is generally set to C, and is changed to $C+\alpha2$ that increases by the change amount $\alpha2$ corresponding to the shift amount P2 from C only for one of the continuous sawtooth waves. Consequently, only the cycle of the one sawtooth wave becomes longer by P2 than usual. As a result, the phase of the sawtooth waves that are continuous after that is delayed by the shift amount P2 from the sawtooth wave for generating the U-phase PWM signal.

The fall timing of the each-phase PWM signal to a low level is synchronized with the fall timing of the sawtooth wave for generating the each-phase PWM signal. Thus, the fall timing of the V-phase PWM signal to a low level is delayed by a time period corresponding to the shift amount P1 from the fall timing of the U-phase PWM signal to a low level. Further, the fall timing of the W-phase PWM signal to a low level is delayed by a time period corresponding to the shift amount P2 from the fall timing of the U-phase PWM signal to a low level.

Also in the present embodiment, therefore, the values of currents respectively flowing through phases of an electric motor M (the U-phase current value, the V-phase current value, and the W-phase current value) can be found on the basis of an output signal of the single current sensor 11, as in the same manner as that in the above-mentioned embodiment.

Moreover, the difference between the U-phase duty set value and the V-phase duty set value corresponds to the value of a current flowing through the V-phase winding (the V-phase current), and the difference between the U-phase duty set value and the W-phase duty set value corresponds to the value of a current flowing through the W-phase winding (the W-phase current). Therefore, by setting each of the shift amounts P1 and P2 to a larger positive value as each of the differences increases, when the V-phase current and/or the W-phase current are/is large and a current flowing through the current path between the motor driving circuit 4 and the ground G is large, a time period during which the current is flowing can be a sufficient time period to output a stable signal from an amplification circuit attached to the current sensor 11. On the other hand, by setting each of the shift amounts P1 and P2 to a smaller positive value as each of the differences decreases, when the V-phase current and/or the W-phase current are/is small and the current flowing through the current path between the motor driving circuit 4 and the ground G is small, an undesirable current produced by the shift in the phase of the each-phase PWM signal can be kept small. Therefore, the value of the current flowing through each of the phases of the electric motor M can be found with high precision.

In the present embodiment, it is assumed that the shift amount P1 corresponding to the difference between the U-phase duty set value and the V-phase duty set value is set, and the shift amount P2 corresponding to the difference between the U-phase duty set value and the W-phase duty set value is set. However, a current value storage section 31 for storing a V-phase current value and a W-phase current value that are found in the past control cycle (e.g., a control cycle right before the current control cycle) may be provided, as indicated by a broken line in FIG. 3. The shift amount P1 of the phase of the sawtooth wave for generating the V-phase PWM signal relative to the sawtooth wave for generating the U-phase PWM signal and the shift amount P2 of the phase of the sawtooth wave for generating the W-phase PWM signal relative to the sawtooth wave for generating the U-phase PWM signal may be set on the basis of the V-phase current value and the W-phase current value that are stored in the current value storage section 31. That is, the shift amount P1 may be set to a larger value as the V-phase current value increases, while being set to a smaller value as the V-phase current value decreases. The shift amount P2 may be set to a larger value as the W-phase current value increases, while being set to a smaller value as the W-phase current value decreases.

Figure 5:
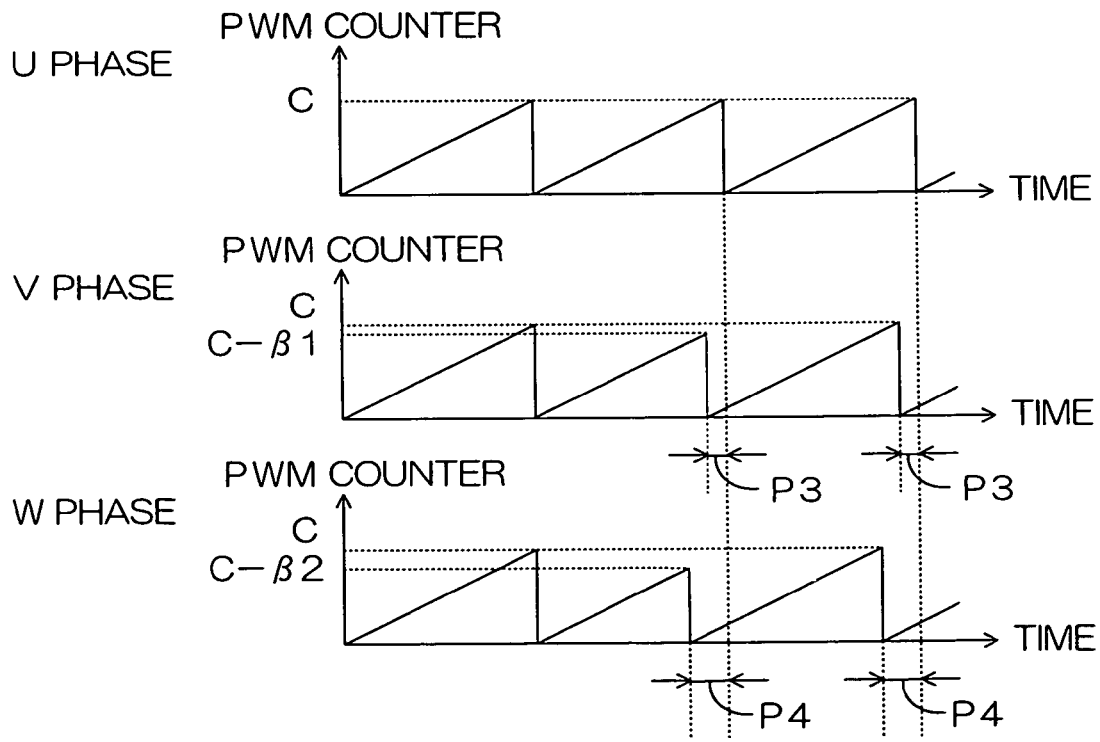
FIG. 5 is a diagram showing another example of a waveform of a sawtooth wave (a carrier wave) for generating an each-phase PWM signal in the another embodiment.

In the present embodiment, a case where the phase of the sawtooth wave for generating the V-phase PWM signal is delayed by the shift amount P1 from the sawtooth wave for generating the U-phase PWM signal, and the phase of the sawtooth wave for generating the W-phase PWM signal is delayed by the shift amount P2 from the sawtooth wave for generating the U-phase PWM signal is taken as an example. However, the fall timing of the V-phase PWM signal may be advanced by a shift amount P3 from the fall timing of the U-phase PWM signal by advancing the phase of the sawtooth wave for generating the V-phase PWM signal by the shift amount P3 from the sawtooth wave for generating the U-phase PWM signal, as shown in FIG. 5. Further, the fall timing of the W-phase PWM signal may be advanced by a shift amount P4 from the fall timing of the U-phase PWM signal by advancing the phase of the sawtooth wave for generating the W-phase PWM signal by the shift amount P4 from the sawtooth wave for generating the U-phase PWM signal.

In this case, the shift amount computing section 23 sets the shift amount P3 to a larger positive value as the difference between the U-phase duty set value and the V-phase duty set value increases, while setting the shift amount P3 to a smaller positive value as the difference therebetween decreases. Further, the shift amount P4 is set to a larger positive value as the difference between the U-phase duty set value and the W-phase duty set value increases, while being set to a smaller positive value as the difference therebetween decreases. The V-phase PWM counter maximum value setting section 24 multiplies the shift amount P3 by the slope of an inclined portion in the waveform of the sawtooth wave for generating the V-phase PWM signal, to find a maximum value change amount β1 corresponding to the shift amount P3. Generally, the PWM counter maximum value may be set to C, and may be set to C-β1 only for one of the continuous sawtooth waves. The W-phase PWM counter maximum value setting section 25 multiplies the shift amount P4 by the slope of an inclined portion in the waveform of the sawtooth wave for generating the W-phase PWM signal, to find a maximum value change amount β2 corresponding to the shift amount P4. Generally, the PWM counter maximum value may be set to C, and may be set to C-β2 only for one of the continuous sawtooth waves.

Although the embodiments of the present invention were described, the present invention can be embodied in another form. For example, in each of the embodiments, the respective fall timings of the each-phase PWM signals to a low level are shifted from one another. However, the respective rise timings of the each-phase PWM signals to a high level may be shifted from one another by setting the shape of each of the sawtooth waves for generating the each-phase PWM signals to such a shape that the sawtooth wave steeply rises and then, the amplitude thereof gradually decreases (that is, a shape obtained by laterally inverting the shape of the sawtooth wave shown in FIG. 2) and shifting the respective phases of the sawtooth waves from one another.

In the first embodiment, the respective phases of the carrier waves (sawtooth waves) for generating the each-phase PWM signals are shifted P at a time. However, the fall timings or the rise timings of the each-phase PWM signals may be shifted from one another by means of a delay circuit or the like using one type of carrier waves in the same phase (e.g., the sawtooth wave in the shape shown in FIG. 2 or the sawtooth wave in a shape obtained by laterally inverting the same) without shifting the phases of the carrier waves.

Furthermore, although in each of the embodiments, the electric power steering system is taken as an example, the present invention is not limited to the electric power steering system. For example, the present invention may be applied to another type of power steering system such as an electric pump-type power steering system for generating a steering assist force by generated hydraulic pressure of an oil pump driven by an electric motor. The present invention may be also applied to a motor vehicle steering system, other than the power steering system, such as a steer-by-wire (SBW) system in which a steering wheel and a steering mechanism are mechanically separated from each other and a driving force produced by an electric motor is applied to the steering mechanism to achieve the steering of a steerable vehicle wheel of a vehicle.

Although the present invention has been described and illustrated in detail, it is clearly understood that these description and illustration are by way of example only and is not to be taken by way of limitation, the spirit and scope of the present invention being limited only by the terms of the appended claims.

The present application corresponds to a Japanese Patent Application NO. 2005-276243 filed with the Japanese Patent Office on Sep. 22, 2005 and a Japanese Patent Application NO. 2006-50781 filed with the Japanese Patent Office on Feb. 27, 2006, the disclosures of which are hereinto incorporated by reference.

What is claimed is:

1. A motor vehicle steering system that drives a multi-phase motor by PWM (Pulse Width Modulation) control in response to an operation of an operation member, to apply a driving force from the multi-phase motor to a steerable vehicle wheel of a vehicle, comprising:

a motor driving circuit connected between a power supply and a ground for driving the multi-phase motor;

PWM signal generating unit for generating an each-phase PWM signal for controlling a current flowing through each of phases of the multi-phase motor and applying the generated PWM signal to the motor driving circuit;

a single current sensor connected between the motor driving circuit and the power supply or the ground; and each-phase current value computing unit for finding an each-phase current value flowing through each of the phases of the multi-phase motor on the basis of an output of the current sensor, wherein the PWM signal generating unit shifts a fall or rise timing of carrier waves of the each-phase PWM signals from one another by a predetermined phase shift amount.

2. The motor vehicle steering system according to claim 1, wherein
the PWM signal generating unit sets a duty set value for each phase on the basis of an each-phase target current value and the each-phase current value found by the each-phase current value computing unit.

3. The motor vehicle steering system according to claim 2, wherein
the PWM signal generating unit comprises shift amount setting unit for setting a phase shift amount on the basis of the duty set value for each phase.

4. The motor vehicle steering system according to claim 3, wherein
the shift amount setting unit sets, on the basis of a difference between the duty set value for a reference phase serving as a basis and the duty set value for a shift phase other than the reference phase, the phase shift amount of the carrier wave of the PWM signal in the shift phase relative to the carrier wave of the PWM signal in the reference phase.

5. The motor vehicle steering system according to claim 1, wherein
the PWM signal generating unit comprises shift amount setting unit for setting a phase shift amount on the basis of the each-phase current value found by the each-phase current value computing unit in a past control cycle.

* * * * *